April 8, 1924.
M. A. EDRANY
MICRO HEIGHT GAUGE
Filed Jan. 17, 1922
1,489,747
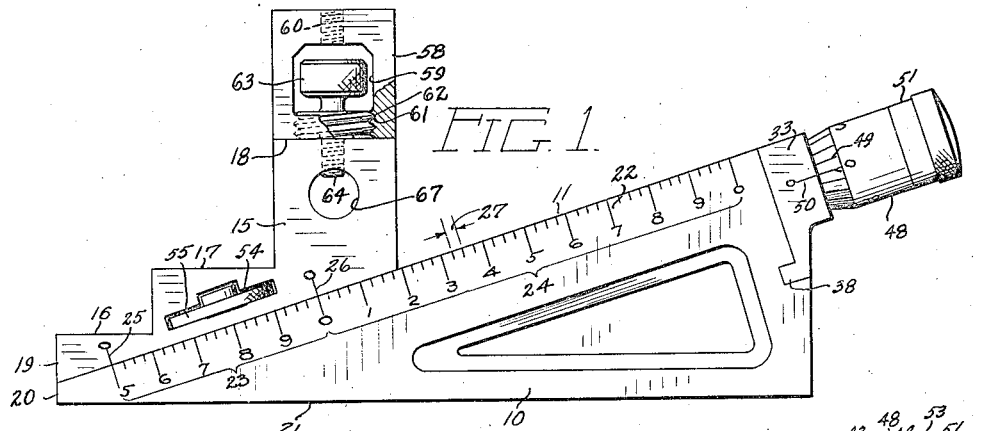
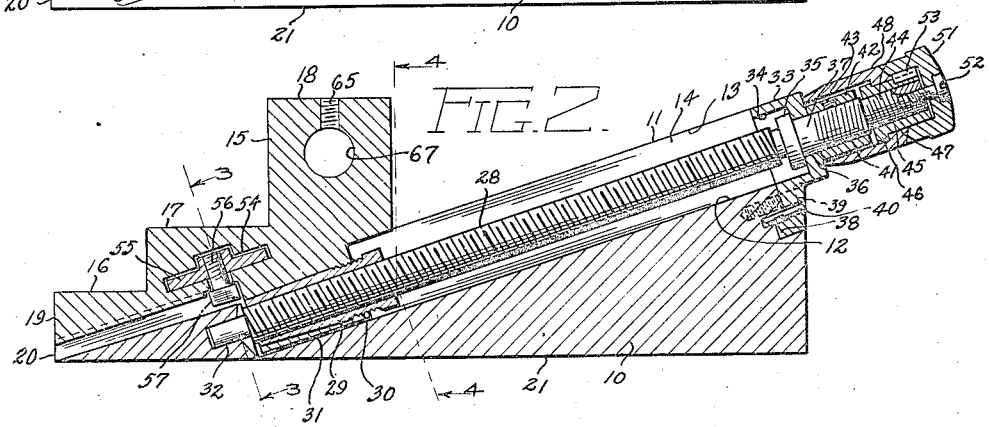
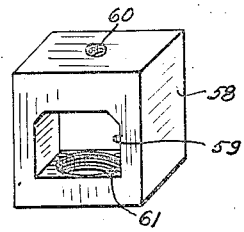
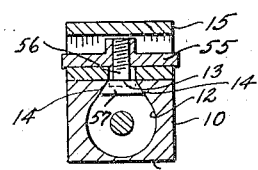
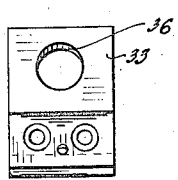
INVENTOR.
Michael A. Edrany
BY Wooster & Davis
ATTORNEYS.

Patented Apr. 8, 1924.

1,489,747

UNITED STATES PATENT OFFICE.

MICHAEL A. EDRANY, OF FAIRFIELD, CONNECTICUT.

MICRO HEIGHT GAUGE.

Application filed January 17, 1922. Serial No. 529,822.

*To all whom it may concern:*

Be it known that I, MICHAEL A. EDRANY, a citizen of the United States, residing at Fairfield, county of Fairfield, State of Connecticut, have invented an Improvement in Micro Height Gauges, of which the following is a specification.

This invention relates to gauges and particularly to a gauge to facilitate the setting of a planer, shaper, or milling machine cutting tool, or similar devices.

It is an object of the invention to provide a device of this character which is simple in construction and which may be easily, quickly, and accurately set for the gauging operation.

With these and other objects in view I have devised the improved gauge illustrated in the accompanying drawing, in which—

Fig. 1 is a side view of the gauge, assembled.

Fig. 2 is a vertical, longitudinal section of the device.

Fig. 3 is a transverse section substantially on the line 3—3 of Fig. 2.

Fig. 4 is a transverse section substantially on the line 4—4 of Fig. 2.

Fig. 5 is a perspective view of the body of the extension block.

Fig. 6 is a side view of the securing element for the extension block, and

Fig. 7 is an end view of the bearing block for the adjusting screw.

The gauge comprises a triangular base 10 provided along its inclined edge 11 with a substantially circular groove 12 and a slot 13 leading from this groove to the surface of the inclined edge. On opposite sides of this slot the walls of the groove are preferably tapered, as shown at 14, although, if desired, the walls may be arranged to correspond with a T-slot. Mounted to slide on the inclined edge 11, is a gauge block 15 provided with a plurality of gauging surfaces, in the form shown three in number and indicated by the numerals 16, 17 and 18 respectively. The number of these surfaces may, however, be varied, if desired. The lowest surface 16 is preferably so arranged that, when the end 19 of the block 15 is in alignment with the small end 20 of the base, this surface will be one-half inch above the lower surface 21 of the base. The intermediate surface 17 is spaced one-half inch above the surface 16 while the surface 18 is preferably one inch above the surface 17. Along the inclined edge 11, the base is provided with a scale 22 arranged as shown, reading from 5 to 1 at its lower portion, indicated at 23, and from 1 to 2 at its upper portion, indicated at 24, the lower zero corresponding to 1 and the upper to 2, these distances being such that movement of a zero mark 25 on the gauge block, which is in alignment with the first line of the scale when the block is in the position shown, along the scale to the position marked zero between the portions 23 and 24 will be the distance required to move the gauge block along the inclined edge 11 to raise the surface 16 from its initial position shown, one-half inch. Thus, because when mark 25 is aligned with lower mark 5 the surface 16 is one half inch above bottom edge 21 of the base, by reading the position of the zero mark 25 on the portion 23 of the scale it will indicate directly the height of the surface 16 above the lower edge 21 for any position of the gauge block between one-half and one inch. With continued movement of the gauge block upwardly along the inclined edge the amount the surface 16 is spaced above the edge 21 over one inch, will be indicated on the portion 24 of the scale. A second zero mark 26 is, however, also provided on the gauge block and is spaced from the lower zero mark 25 by a distance equal to the length of the portion 23 of the scale, so that when the mark 25 is on the one-half inch mark the mark 26 will be on the one inch mark which will be indicated zero on the scale. It will now be apparent that, if the gauge surface 17 is being used, the distance which this surface is elevated over one inch above the edge 21 of the base will be indicated on the portion 24 of the scale by the mark 26. If the mark 26 only were used, when using the gauging surface 16 one-half inch would have to be added each time to the reading of this mark on the portion of the scale 24, which would be likely to cause confusion and error. By the use of the mark 25, however, on the lower portion of the scale, the height of the gauging surface 16 above the edge 21 may be read directly. The distances between the graduations in the scale may be any desired amount, but I prefer to space the lines indicated at 27 to indicate a rise in the surfaces of the gauge of .025 inch.

I preferably employ means for adjusting the gauge block along the inclined edge of the base. My improved means for doing this comprises an adjusting screw 28 having threaded engagement with an internally threaded split bushing 29, which bushing is also externally threaded at 30 and externally tapered as shown, for insertion in a correspondingly threaded and tapered opening in the extension 31 of the gauge block. This extension is preferably integral with the block and extends into the groove 12 and has inclined surfaces corresponding to the walls 14 of the base to hold the gauge block to the inclined edge. The adjusting screw is preferably provided with a bearing 32 at its lower end in the base, and is swiveled adjacent its upper end in a bearing block 33 removably secured to the base. This block is recessed at 34 to receive a flange 35 on the screw and has a bearing 36 for the cylindrical portion 37 of the screw. The lower end of the block is provided with a transverse rib 38 adapted to seat in a corresponding grove in the base and is provided with suitable openings for securing screws 39 threaded into the base, a dowel pin 40 being provided for properly positioning the bearing block.

The screw is threaded beyond the bearing block, as indicated at 41, to receive a nut 42 which may be locked in position by a set screw 43. The flange 35 and the nut 42 bear against the opposite sides of the bearing in the block to prevent longitudinal movement of the screw therein. Beyond the threaded portion 41, the screw is preferably reduced and again threaded, as indicated at 44, to receive a bushing 45 threaded thereon, this bushing being provided with a flange 46 at one end. Mounted on this bushing and provided with an inwardly extending annular flange 47 is a sleeve 48, flange 47 being adapted to rest against flange 46, and this sleeve being adapted to embrace the nut 42. It is also provided with a scale 49 coacting with a zero mark 50 carried by the base preferably on the bearing block 33. This scale 49 preferably has twenty-five divisions and the pitch of the screw 28 is such that one revolution thereof will move the gauge block 15 a distance equal to one of the divisions 27 or raise the gauging surfaces thereon .025 inch above the edge 21 of the base, so that, turning of the scale 49 one division with reference to mark 50 will raise the gauging surface .001 inch. These are the scales preferably employed though others may be used, if desired.

Secured over the ends of the screw and the bushing 45 is a cap 51 which may be secured to the end of the screw 28 by a screw 52 tapped into the end of this adjusting screw, and this cap is keyed to the bushing 45, as indicated at 53, so that, if this cap is rotated relatively to the adjusting screw 28, it will also rotate the bushing 45 and sleeve 48 whereby they may be adjusted on the screw 28. After adjustment, they may be clamped in adjusted position by the screw 52. They are then locked to the adjusting screw 28, and are used to rotate this screw in adjusting the position of the gauge block. Also, by loosening the screw 52, the sleeve 48 may be turned on the bushing 45 to adjust the scale 49 carried thereby to bring it to the proper position should it be thrown out of proper position relative to mark 50 in adjusting the bushings 29 or 45.

Means are provided for clamping the gauge block 15 in any adjusted position on the inclined edge 11. This means is entirely separate from the means for moving the block along this inclined edge so that, after the block has been adjusted, the act of clamping it in this position will not throw it out of adjustment. The block is provided with a transversely extending opening 54 having a knurled nut 55 therein, the rim of this nut projecting beyond the sides of the block a sufficient distance, as shown in Fig. 3, so it may be gripped and rotated. This nut has threaded engagement with the shank of a T-bolt 56, the head 57 of which lies in the groove 12 and has inclined surfaces fitting the walls 14 of this groove. Tightening of the nut 55 will press this head against the walls 14 and clamp the block 15 in position.

I have also provided an improved extension block which may be added to the upper gauging surface 18 to increase the capacity of the gauge. This block 58 is preferably one inch high with the top and bottom surfaces thereof parallel and accurately ground. The block is provided with a transverse opening 59, and also provided with aligned threaded openings 60 and 61 leading from the upper and lower faces respectively of the block to the transverse opening. The lower opening is, however, larger than the upper and is adapted to receive the threaded portion 62 of a securing element having a head 63 within the opening 59. This head may be knurled or provided with flat sides to facilitate turning of the element. The element is also provided with a threaded extension 64 adapted to engage the opening 60 of a corresponding block, or a corresponding opening 65 leading from the surface 18 of the gauge block, to secure the extension blocks together or to the gauge block. The securing element is also provided between the threaded portions 62 and 64 with a pair of parallel flat surfaces 66, milled or otherwise formed thereon, so that, should the extension 64 be broken off, the element may be gripped by a suitable tool to remove it from the block. It will thus be seen, should this extension 64 be broken, it is not necessary to renew the whole block but merely insert a new securing element. The opening 65 in the block 15 leads to a transverse opening 67 in this block, and the extension 64 is of sufficient length to project into this opening, as shown in Fig. 1, when the extension block is in position. Another and similar block may be secured on top of block 58 in which case the extension 64 projects into the transverse opening 59 of the block 58, so that, should this extension be broken off in the block, the projecting end in the transverse opening 67 or 59 as the case may be may be gripped and rotated by a suitable tool, and removed through the opening.

Having thus set forth the nature of my invention, what I claim is:

1. A device of the character described comprising an elongated base member having a straight edge and another straight edge inclined to said first mentioned straight edge, a gauge block slidably mounted upon said inclined edge and provided with a plurality of gauging surfaces parallel to and spaced different distances from said first mentioned straight edge, there being a scale on the base member along the inclined edge thereof and a plurality of zero marks on the gauge block cooperating with the scale on the base and spaced from each other a distance on the scale indicating the distance the block must be moved on said inclined edge to move the block toward or from the first mentioned straight edge a distance equal to the distance between the gauging surfaces.

2. A device of the character described comprising an elongated base member having a straight edge and another straight edge inclined to said first mentioned straight edge, a gauge block slidably mounted upon said inclined edge and provided with a plurality of gauging surfaces parallel to and spaced different distances from said first mentioned straight edge, there being a scale on the base member along the inclined edge thereof and a plurality of zero marks on the gauge block cooperating with the scale on the base and spaced from each other a distance on the scale indicating the distance the block must be moved on said inclined edge to move the block toward or from the first mentioned straight edge a distance equal to the distance between the gauging surfaces, and a screw swiveled in the base and having threaded engagement with the block whereby the same may be adjusted along the inclined edge.

3. A device of the character described comprising an elongated base having a straight edge and another straight edge inclined to said first mentioned straight edge, a gauge block slidably mounted upon said inclined edge and provided with a gauging surface parallel to said first mentioned straight edge, there being coacting indicating means on the base and block, means for adjusting the gauge block along the inclined edge comprising a screw swiveled in the base, an element secured to the screw and adjustable around the same, said element and base being provided with coacting indicating means, and an externally and internally threaded split bushing engaging the screw and block, said bushing being also externally tapered so that adjustment thereof in the block will take up wear between the bushing and screw.

4. A device of the character described comprising an elongated base having a straight edge and another straight edge inclined to said first mentioned straight edge, a gauge block slidably mounted upon said inclined edge and provided with a gauging surface parallel to said first mentioned straight edge, a bearing block removably secured to the base, an adjusting screw swiveled in the bearing block and having threaded engagement with the gauge block, said screw being provided with a collar and adjustable nut engaging opposite sides of its bearing in the bearing block, and a screw operating element adjustably secured to the screw beyond the nut, said bearing block and operating element being provided with coacting indicating scale elements.

5. A device of the character described comprising an elongated base having a straight edge and another straight edge inclined to said first mentioned straight edge, a gauge block slidably mounted upon said inclined edge and provided with a gauging surface parallel to said first mentioned straight edge, an adjusting screw swiveled in a bearing in the base and having threaded engagement with said block, said screw being provided with stop elements on opposite sides of its bearing in the base one of which elements is adjustable longitudinally of the screw, and a screw operating means mounted on the screw beyond the adjustable element and comprising a cylindrical element adjustable around the screw and means for securing it in adjusted position, said latter element and the base being provided with coacting indicating scales.

6. A device of the character described comprising an elongated base having a straight edge and another straight edge inclined to said first mentioned straight edge, a gauge block slidably mounted upon said inclined edge and provided with a gauging surface parallel to said first mentioned straight edge, said block being provided with a transverse opening below said surface and a threaded opening leading from the surface to the transverse opening, and an extension block having a threaded projection adapted for engagement in said threaded opening to secure the block in position on the gauging surface, and of sufficient length to extend into the transverse opening.

7. A device of the character described comprising an elongated base having a straight edge and another straight edge inclined to said first mentioned straight edge, a gauge block slidably mounted upon said inclined edge and provided with a gauging surface parallel to said first mentioned straight edge, said block being provided with a tapped opening leading from said surface, and an extension block provided with a threaded opening leading from a side of the block, and an attaching element threaded in this opening and having a threaded extension of a smaller diameter adapted to engage the tapped opening to secure the extension block in position on the gauging surface, said attaching element being provided with substantially parallel plane surfaces between its two threaded portions to facilitate its removal from the extension block.

8. An extension block for gauges, said block having parallel surfaces and a transverse opening between said surfaces, said block also being provided with aligned tapped openings leading from the said surfaces to said transverse opening, and a securing element having threaded engagement with one of said openings, a head in the transverse opening and also being provided with a threaded extension adapted for engagement in a corresponding aligned opening in another block and of sufficient length to project into a corresponding transverse opening in said block.

9. A device of the character described comprising a base, a gauge block slidably mounted upon the base and provided with a gauging surface, there being coacting indicating means on the base and block, means for adjusting the block in the base comprising an adjusting screw swiveled in a bearing in the base and having threaded engagement with the block, said screw and base being provided with coacting means to prevent longitudinal movement of the screw in the base, and an element secured to the screw and adjustable around the same, said element and base being provided with coacting indicating means.

In testimony whereof I affix my signature.

MICHAEL A. EDRANY.